United States Patent [19]
Wilber

[11] Patent Number: 4,698,615
[45] Date of Patent: Oct. 6, 1987

[54] CANVAS ADAPTER ALARM

[76] Inventor: William E. Wilber, 468 South St., Apt. F., Lockport, N.Y. 14094

[21] Appl. No.: 832,090

[22] Filed: Feb. 24, 1986

[51] Int. Cl.[4] .......... B60R 25/00; B63B 17/00
[52] U.S. Cl. .......... 340/63; 340/568; 340/668; 114/201 R; 114/361; 114/172; 114/343; 114/364
[58] Field of Search .......... 340/63, 571, 548, 568, 340/590, 665, 668, 687; 114/201 R, 343, 361, 364, 172; 296/100, 136

[56] References Cited

U.S. PATENT DOCUMENTS

| | | | |
|---|---|---|---|
| 1,607,494 | 11/1926 | Von Tell | 114/361 |
| 2,780,689 | 2/1957 | La Cavera | 340/548 |
| 4,024,526 | 5/1977 | Banner | 340/548 |
| 4,075,723 | 2/1978 | Bareis et al. | 114/361 |
| 4,118,691 | 10/1978 | Sims | 340/548 |
| 4,363,284 | 12/1982 | Monroe | 114/361 |

*Primary Examiner*—Donnie L. Crosland

[57] ABSTRACT

An adapter alarm for boats for theft prevention. A multiple number of spaced brackets attached to the gunnels of the boat, and an automotive alarm plunger switch actuator is secured in each bracket and wired to a key operated alarm unit that is battery operated. Engaged with each plunger switch actuator is a split-edged clamp that is force-fitted to the shaft of the plunger and which is secured by a cord to a hook attached to the boat covering canvas. The circuit is wired to the plungers in the brackets and when the canvas is disturbed the clamps release the plungers which close the circuit to the alarm unit aboard the boat.

5 Claims, 2 Drawing Figures

CANVAS ADAPTER ALARM

BACKGROUND OF THE INVENTION

1. Field of the Invention

This invention relates to alarm devices, and more particularly, to a canvas adapter alarm.

2. Description of Prior Art

Alarm systems and alarm devices have been devised and are many types. The adapter alarm in accordance with the present invention, is designed to particularly adapt to boats, for the security thereof.

The principal object of this invention is to provide a canvas adapter alarm, which will be unique, in that it will provide security for a boat when left unattended, thus, preventing the theft thereof, or the removing of equipment by unauthorized persons.

Another object of this invention is to provide a canvas adapter alarm, which includes a plurality of tie-down units wired to a key operated switch of an alarm unit, and when the canvas covering the boat is disturbed, the alarm siren or other device will give indication that a theft is about to take place, and the invention will enable its owner to feel free to stop at restaurants, or go sight seeing. Even at night in a parking lot the alarm will give the owner peace of mind, and when the boat is at home or where other boats are docked no matter whether they are approached by water or dock, the alarm will sound, informing someone that there has been a break-in.

SUMMARY OF THE INVENTION

Figure 1:
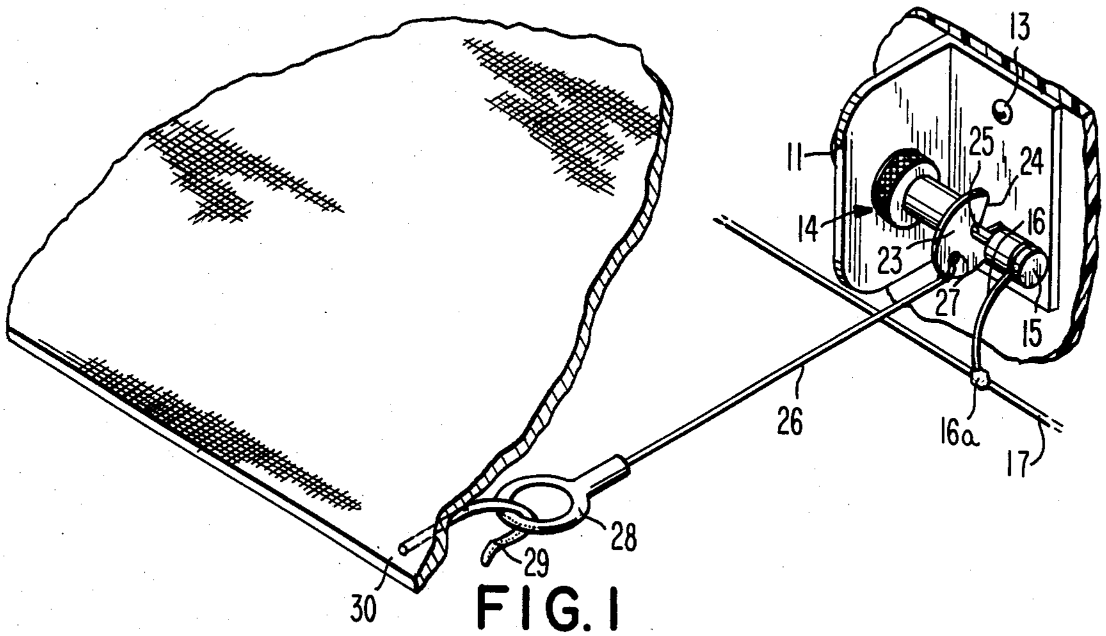
FIG. 1 is a perspective view of an alarm tripping device of the present invention.
Figure 2:
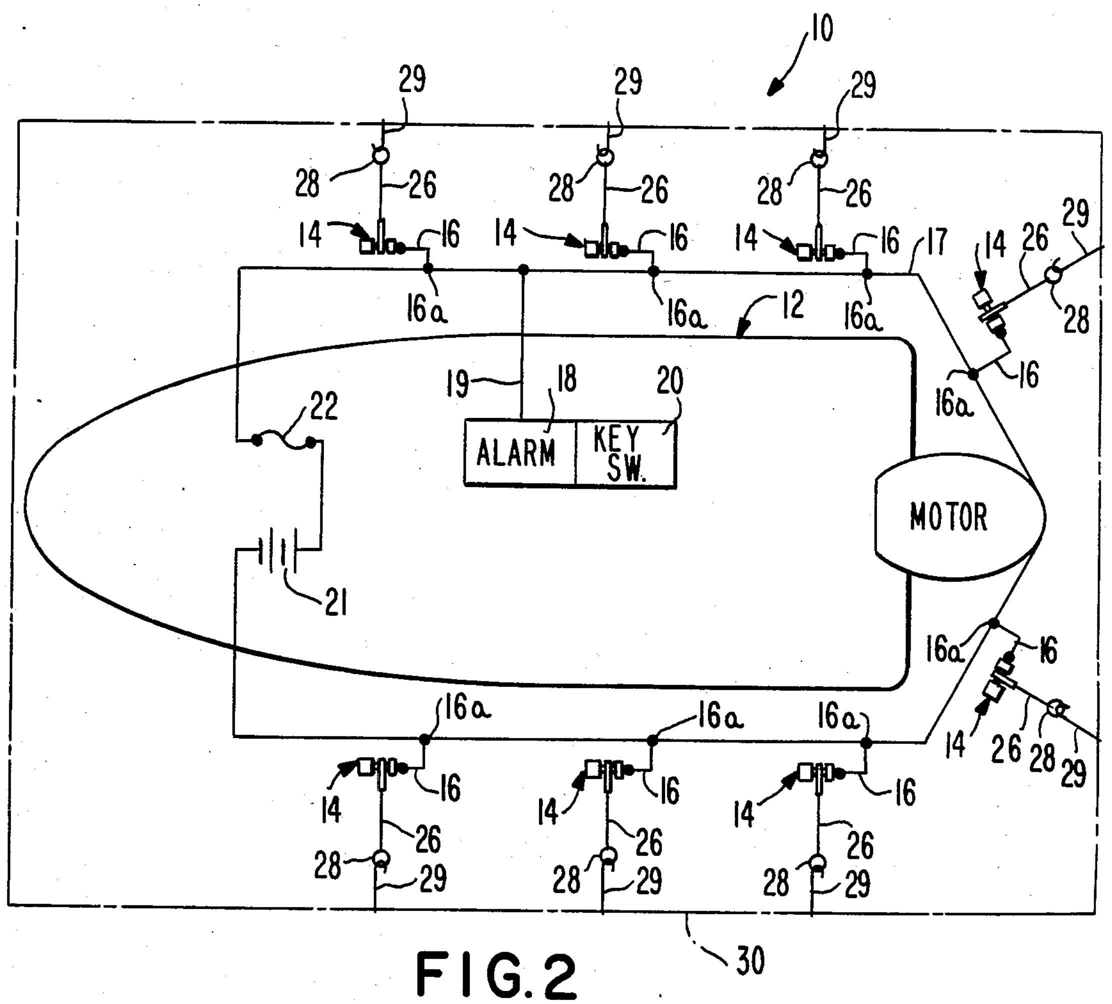
FIG. 2 is a schematic wiring diagram of the invention, showing the canvas in phantom lines.

An adapter alarm designed for boats, comprising a plurality of tie-down units wired to a battery operated circuit with indication means, such as a siren or other device, and a key operated switch is also provided. The tie-down units are also provided with boat mounted bracket means and plunger means that are triggered by the displacement of the canvas covering the boat.

DETAILED DESCRIPTION

Accordingly, an alarm 10 is shown to include a plurality of angle brackets 11 mounted to the underside of the gunnels of a boat 12, by means of suitable fasteners 13. An opening, not shown, is provided through one side of the brackets 11, and an automotive plunger 14 is fastened in the opening provided in each bracket 11. Plunger 14 is of the alarm type and non-corrosive, and its head 15 is fastened by wire 16 to continuous wire 17 wired to the siren type alarm unit 18 that is operated by means of key switch 20. Wire 17 is in series with battery 21 and a protective fuse 22. A clamp 23 is provided with an angular cut-out opening 24 that engages with shaft 25 of plunger 14, and a nylon cord 26 is fastened in opening 27 of clamp 23 at one end, and the other end of cord 26 is fixedly secured in an eye 28 which removably receives a hook 29 that is fixedly secured to the edge portions of boat covering canvas 30.

It shall be noted, that clamp 23 is force-fitted to shaft 25 of plunger 14, and the brackets 11 are fastened with their openings for the plungers 14 as close to the edge as possible for a straight pull, and they are placed approximately four feet apart. The plungers 14 may also be mounted facing either way.

It shall also be noted, that alarm 10 is to be fabricated as a kit, and may include the alarm unit 18, or it may be bought as a separate unit.

In use, the plurality of brackets 11 are fastened approximately four feet apart to the underside of the gunnels of boat 12 by pop-rivets or screw pop-rivets. On fiberglass and wooden boats, a ground wire from bracket 11 to bracket 11 must be run and fastened to the pop-rivets or fasteners 13.

The wire is stripped for three-quarters of an inch and folded and twisted to fit the ground outlet wire which will stay continuous. The plungers 14 are then placed in the brackets 11 facing in either direction, and the continuous wire 17 alongside the brackets. Wires 25 are cut to five inches in length for each plunger 14, making sure that the continuous wire 17 is loose enough to be fastened to the boat 12. Continue by fastening the plunger wire 16 to the continuous wire 17 with the electrical connector block 16*a*. After the above connections are completed, the wire 17 is concealed as much as possible. Using a hat glue gun, place a small amount of glue on wire, press and hold for a few seconds. Glue approximately twelve inches apart while making sure the wire is free enough for the plunger 14 to work. The clamp 23 is placed on the plunger shaft 25 by pressing with the fingers. This will hold the plunger 14 in slightly, and separate the plunger 14 from making contact. The canvas 30 is then placed on the boat 12. The cord 26 is then threaded into and fastened in the opening 27 of the clamp 23, and a knot is tied in its end to hold cord 26 above the boat 12, leaving room for the user to get his hand inside canvas 30.

On the canvas 30 the user marks with chalk where the canvas hooks 29 will be placed. The cord 26 is then cut approximately three inches above that point and the hook 29 is placed in the canvas 30. The plastic eye 28 is placed on the hook 29, and there should be approximately one and a half inches of slack in the cord 26.

If the user has an outboard cover, from the rear of the corner of 10, another hook 29 can be placed and the cord 26 run under the canvas 30. If the user's boat layout will not enable him to put brackets 11 four feet or closer together, he may want to protect this area with an angled cord to hook arrangement.

When covering the boat 12, the clamps 23 should be left attached to the plungers 14 at all times, and they should be checked to make sure they are set properly. The cord should be layed on the gunnel when covering and the user should fasten the snaps or rubber cords and adapters at the same time.

The key switch 20 should be under the canvas 30 in such a manner, so as to enable the user to lift the edge and set the alarm unit 18, or turn it off without releasing the adapter alarm 10, and it is suggested that no stickers be posted to notify anyone that there is a security system aboard the boat 12.

While various changes may be made in the detail construction, such details will be within the spirit and scope of the present invention, as defined by the appended claims.

What I now claim is:

1. A canvas adapter alarm for boats, comprising a plurality of mounting brackets secured to a boat;

a plunger switch actuating means secured in said mounting brackets;

alarm means that includes a key switch for arming and disarming said alarm means;

clamp means in operative relationship with said plunger switch actuating means;

chord means connected between said canvas and said clamp means, whereby when said canvas is disturbed, said clamp means causes said plunger switch actuating means to actuate said alarm means.

2. A canvas adapter alarm for boats as set forth in claim 1, wherein said mounting brackets are spaced from each other and fastened fixedly to gunnels of a boat, and one end of each said plunger switch actuating means is received and fastened in an opening provided in one side of each one of said mounting brackets.

3. A canvas adapter alarm for boats as set forth in claim 2, wherein a head of each said plunger switch actuating means is secured by a wire to said alarm means.

4. A canvas adapter alarm for boats as set forth in claim 3, wherein said clamp means is disc in shape with an angular cut-out opening in an outer peripheral edge and a shaft of said plunger switch actuating means is force-fitted in the cut-out opening of said clamp means, and said clamp means is of a nonconductive material that prevents said head of said plunger switch actuating means from making contact to close said alarm means until said cord is pulled when said canvas is disturbed.

5. A canvas adapter alarm for boats as set forth in claim 4, wherein said cord is fixedly secured to said clamp means at one end and fixedly secured to an eye at the opposite end, and said eye is removably received in a hook fixedly secured to an edge portion of said canvas received over said boat.

* * * * *